UNITED STATES PATENT OFFICE.

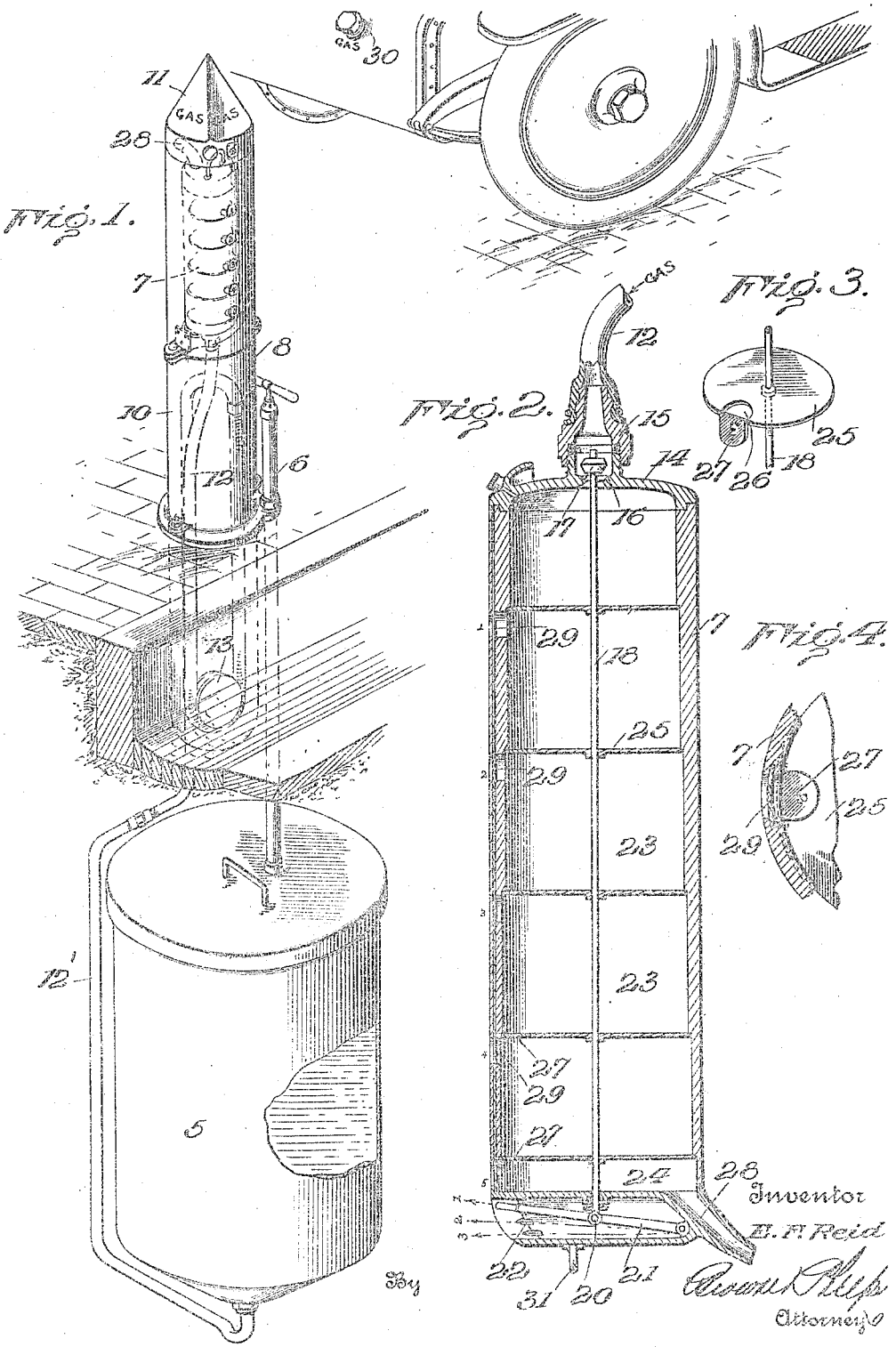

ELTON F. REID, OF WACO, TEXAS.

LIQUID-DISPENSING APPARATUS.

1,291,140.　　　　Specification of Letters Patent.　　Patented Jan. 14, 1919.

Application filed June 29, 1918.　Serial No. 242,529.

*To all whom it may concern:*

Be it known that I, ELTON F. REID, a citizen of the United States, residing at Waco, in the county of McLennan and State of Texas, have invented certain new and useful Improvements in Liquid-Dispensing Apparatus, of which the following is a specification.

This invention relates to liquid dispensing apparatus and more particularly to that type adapted to dispense and simultaneously measure the liquid delivered. As hereinafter described the invention will be shown as being particularly applicable to devices for measuring and dispensing gasolene, although, it is to be understood that other fluids or liquids may be measured and dispensed in a somewhat similar manner.

One of the objects of the present invention is to provide a simple and practical apparatus of the above general type for measuring and dispensing liquids and particularly one which will allow the purchaser to see that the exact amount purchased is actually delivered to him. With devices now in general use, it is impossible for the purchaser to ascertain definitely that the exact amount purchased is really delivered to him. A further object is to provide an apparatus of the above general character which may be easily handled and operated and capable of a relatively large range of movement. A further object is to provide a device which may be easily and quickly installed and having its parts so positioned and arranged that a continuous stream of fluid may be delivered and the measuring features disregarded if so desired.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings like characters of reference denote corresponding parts throughout all the views, in which—

Figure 1 is a semi-diagrammatic perspective elevational view showing one application of the invention with certain parts broken away or in dotted lines in order that the full invention may be clearly seen.

Fig. 2 is a vertical sectional view of the measuring and delivering container;

Fig. 3 is a detailed perspective view of one of the parts shown in Fig. 2, while Fig. 4 is a detailed fragmentary plan view of a portion of the container.

Referring now to the drawings in detail, 5 denotes a main supply tank preferably located in a safe position under ground. A pump 6 of any desired character is shown for delivering the contents thereof to a measuring container 7 housed in a suitable casing 8 above the level of the ground. As herein shown the pump 6 is of that type adapted to increase the air pressure in the upper part of the tank in a well known manner, although it is of course to be understood that any desired type of pump may be used. The casing 8 preferably comprises a base 10 having a removable top 11 for permitting removal of the measuring receptacle. This receptacle 7 is connected at its lower end by means of a flexible pipe 12 as shown in Fig. 1 with a pipe 12′ communicating with the bottom of the tank 5. The flexible pipe 12 passes over a weighted sheave pulley 13 in order to prevent tangling of the pipe and to aid in restoring the parts to housed position.

The receptacle as shown more clearly in Fig. 2 comprises a general cylindrical body having a head 14 provided with a suitable nipple 15 for connecting it with the pipe 12. The head contains a valve seat 16 with which a valve 17 is adapted to coact. This valve is at one end of a rod 18 the opposite end of which is pivoted at 20 to a lever 21 adapted to engage in one of three notches 22 indicated by the small numerals 1, 2 and 3 in Fig. 2. When the receptacle is removed from the support 8, the gasolene or other liquid is free to pass into the interior of the receptacle until the desired level is reached, although its removal is not essential to the mere filling of the receptacle. When the lever 21 is in notch 1 the receptacle may be rapidly filled. When in the notch "2" the valve will be locked in a semi-open position, thereby to permit a slow continuous stream of gasolene to flow through the receptacle. When the lever 21 is in the notch "3" then the supply of gasolene will be completely shut off to the receptacle 7.

It will be noted that the receptacle is divided into a plurality of chambers 23 in the present case five, of substantially equal size. The bottom chamber 24, Fig. 2, may be disregarded so far as the measuring is concerned. These chambers are formed by means of diaphragms 25 as shown in Fig. 3, each provided with an opening 26 adapted to be closed by means of a floating flap 27. A discharge outlet 28 permits the liquid to be easily directed in the filling spout 30 of an automobile, as shown in Fig. 1. Windows 29 permit one to see the level to which the receptacle 7 is filled.

The method of use and operation of a device of this type is substantially as follows:

Assume the parts to be in position shown in Fig. 1, the pump 6 is actuated unless previous actuation has stored sufficient air pressure in the tank 5 to force the gasolene up through the pipe 12′, flexible connection 12 and into the receptacle 7 held in a position inverted to that shown in Fig. 2, that is the discharge nozzle 28 is at the top. It is of course, to be assumed that the controlling lever 21 is positioned in the proper notch according to circumstances to permit the gasolene to flow rapidly upwardly into one chamber after another through the openings 26 in the partitions 25 in clear view of the buyer. As the gasolene reaches one level after another the floating pivoted flaps 27 will be moved upwardly, as shown in Fig. 1, to indicate that the chamber immediately below said flap has been filled. Thus, when the final chamber 23 has been filled the gasolene will cause the last flap 27 to move upwardly opposite the sighting hole 29 shown in Fig. 2 and then overflow into the relatively small chamber 24. The container 7 is then lifted by means of a handle 31 and the nozzle 28 inserted in the filling opening 30 of the gasolene tank.

It is of course to be assumed that in the meantime the valve 17 is closed by means of lever 21 to prevent a further amount of gasolene entering the receptacle. If it is desired to merely fill a tank regardless of the quantity then the lever 21 is moved to the intermediate notch denoted by the small numeral "2" or notch 1 if preferred and the pump actuated to cause a continuous stream of gasolene to pass downwardly through the several openings 26 and out the discharge spout 28.

It is thus seen that the present invention provides a simple and practical apparatus of the above general type well suited and adapted for dispensing and measuring gasolene. It has the convenience of portability and allows the purchaser to positively see that the actual amount of gasolene purchased by him is delivered to his car.

I realize that considerable variation is possible in the details of construction and arrangement of parts without departing from the spirit of my invention, and I therefore do not intend to limit myself to the specific form shown and described.

I claim:

1. In an apparatus of the character described, in combination, a supply tank, a delivery receptacle divided into sections, a flexible connection between said tank and receptacle, said connection containing considerable slack, means for forcing the liquid from said supply tank into said receptacle, and a discharge means at one end of said receptacle, said receptacle being portable whereby it may be easily inverted by reason of said flexible connection after being filled from said main tank to discharge its contents.

2. In an apparatus of the character described, in combination, a main tank, a delivery receptacle, a support adapted to hold said delivery receptacle in normal upright position, means for forcing a fluid from said main tank up through the bottom of said receptacle, and means including a handle and a flexible connection between the bottom of said receptacle and said tank whereby said receptacle may be removed from its support and inverted for discharging the contents thereof.

3. In an apparatus of the character described, in combination, a main tank, a delivery receptacle, a support adapted to hold said delivery receptacle in normal upright position, means for forcing a fluid from said main tank up through the bottom of said receptacle, means including a handle and a flexible connection between the bottom of said receptacle and said tank whereby said receptacle may be removed from its support and inverted for discharging the contents thereof, and means associated with said receptacle for measuring and indicating the amount of liquid therein.

4. In an apparatus of the character described, in combination, a main tank, a delivery receptacle, a support adapted to hold said delivery receptacle in normal upright position, means for forcing a fluid from said main tank up through the bottom of said receptacle, means including a flexible connection between the bottom of said receptacle and said tank whereby said receptacle may be inverted for discharging its contents, and means associated with said receptacle for measuring and indicating the amount of liquid therein, said means comprising a plurality of partitions dividing the receptacle into substantially equal chambers and passages from one chamber to the other.

5. In an apparatus of the character described, in combination, a main tank, a delivery receptacle, a support adapted to hold said delivery receptacle in upright position, means for forcing a fluid from said main tank up through the bottom of said receptacle, means including a handle and a flexible connection between the bottom of said receptacle and said tank whereby said receptacle may be inverted for discharging the contents thereof, and means associated with said receptacle for measuring and indicating the amount of liquid therein, said means comprising a plurality of partitions dividing said receptacle into substantially equal chambers, said partitions having passages from one chamber to the other, and means for indicating to an observer the extent to which said receptacle is filled.

6. In an apparatus of the character described, in combination, a main supply tank, a delivery receptacle, a flexible connection between said supply tank and said delivery receptacle, said connection containing considerable slack, and means for forcing the liquid from the supply tank to said delivery receptacle, said delivery receptacle being portable and provided with a discharge outlet at its upper end when in normal position whereby it may be easily inverted by reason of said flexible connection after being filled from said supply tank to discharge its contents.

In testimony wherof I affix my signature in presence of two witnesses.

ELTON F. REID.

Witnesses:
W. G. WETHERBY,
I. O. BURTON.

Copies of this patent may be obtained for five cents each, by addressing the "Commissioner of Patents, Washington, D. C."